United States Patent [19]

Granzotto et al.

[11] Patent Number: 4,928,905
[45] Date of Patent: May 29, 1990

[54] ONE-WAY CLUTCH ASSEMBLY

[75] Inventors: Robert Granzotto; Wah K. J. Wong, both of Toronto, Canada

[73] Assignees: Arena Recreations (Toronto) Limited; William Lawrence Heisey, A Partnership Trading as Single Play Video, both of Toronto, Canada

[21] Appl. No.: 345,663

[22] Filed: May 1, 1989

[51] Int. Cl.⁵ .............................................. G11B 15/32
[52] U.S. Cl. .................... 242/201; 242/67.4; 242/200; 192/43.1; 192/46
[58] Field of Search ............................... 242/198–201, 242/67.4, 202–204; 192/43.1, 46

[56] References Cited

U.S. PATENT DOCUMENTS

| 2,647,599 | 8/1953 | Storer et al. | 192/43.1 |
| 4,346,859 | 8/1982 | Osanai | 242/201 |
| 4,512,535 | 4/1985 | Dickson et al. | 242/200 |
| 4,754,939 | 7/1988 | Kaferbock et al. | 242/201 |
| 4,838,401 | 6/1989 | Nagano | 192/46 X |

Primary Examiner—Stuart S. Levy
Assistant Examiner—Steven M. duBois
Attorney, Agent, or Firm—Fetherstonhaugh & Co.

[57] ABSTRACT

In a reel assembly of a tape cassette a one-way clutch mechanism is provided which serves to prevent rotation of the reel in the direction required for the purposes of rewinding a tape thereon. The one-way clutch mechanism includes a slipway channel which extends circumferentially of the axis of rotation of the reel. The reel assembly includes a first clutch member which is designed to be driven by the power output shaft of the winding mechanism and a second member which is designed to be held fast with respect to the cassette. A slipway channel is formed at an interface between the first and second clutch members such that a portion of the channel is formed in the first member and a portion of the channel is formed in the second member. A pawl displacing ring is mounted in the slipway channel so that it bears against the second member and is drivingly connected to the first member by means of a pawl. The pawl is pivotally mounted in the first member and is movable between a retracted position out of engagement with the second clutch member and an extended position in which it engages the second member to prevent relative rotation between the first and second members. The displacer ring serves to displace the pawl outwardly from its retracted position to its extended position in response to rotation of the first member in the second rotational direction.

29 Claims, 6 Drawing Sheets

ONE-WAY CLUTCH ASSEMBLY

BACKGROUND OF INVENTION

This invention relates to a one-way clutch assembly. In particular, this invention relates to a reel assembly for a tape, cassette which incorporates a one-way clutch assembly.

DESCRIPTION OF RELATED ART

U.S. Pat. No. 4,512,535, Dickson et al, discloses a tape cassette assembly which incorporates a one-way clutch. While this clutch assembly operates effectively, it employs roller members which ride on a ramp surface and which are wedged between the ramp surface and a portion of the rotating housing in order to lock the reel against rotation. The clutch mechanism is quite bulky and it includes a substantial number of parts and is therefore a relatively expensive addition to a tape cassette.

In addition, due to the high radial loads which are applied to the clutch mechanism, it is necessary to make the components from metal to ensure that the clutch will operate satisfactorily. This adds considerably to the manufacturing costs.

The use of a moving pawl and one or more locking shoulders which are engaged by the pawl is well-known in one-way mechanisms such as ratchets. The pawl is usually spring-loaded so as to, be biased toward engagement with the shoulder. Because of the spring loading, the pawl is urged into the cavity which is formed in order to create a shoulder and this constant movement of the pawl into and out of the cavity can cause a considerable chatter. To employ this known type of pawl in a one-way clutch mechanism of a reel of a tape would generate an undesirable noise level which could detract from the pleasure derived from the use of the tape.

The pawl type of clutch mechanism would also tend to create a resistance to the free rotation which would increase the driving torque required to drive the cassette reel and any such increase in the required driving torque can adversely affect the operation of a machine such as a VCR which has built-in sensors designed to detect an overload condition resulting from a jam in the tape which will activate it when a torque level above a predetermined level is detected. The introduction of any clutch mechanism which would increase drag is very undesirable.

It is an object of the present invention to provide a one-way clutch mechanism in which the drag applied to the mechanism when it is driven in the operating direction of rotation is minimal.

It is a further object of the present invention to provide a one-way clutch mechanism in a tape cassette which is of a simple and inexpensive construction.

SUMMARY OF INVENTION

According to one aspect of the present invention, there is provided in a one-way clutch assembly for preventing rotation of a first member in a first rotational direction with respect to a second member about an axis of rotation and in which a pawl has its proximal end mounted in a first seat for pivotal movement of the pawl with respect to the first member so as to be movable between a retracted position in which it permits free rotation of the first member relative to the second member in a second rotational direction and a second position in which the distal end of the pawl extends into a butting relationship with a first shoulder formed on the second member to prevent free rotation in the first rotational direction, the improvement of a slipway channel formed between a portion of the first member and a portion of the second member and arranged on the perimeter of a circle which has its axis coaxially arranged with respect to said axis of rotation, said channel having oppositely disposed side walls formed one on the first member and one on the second member, pawl displacer means slidably mounted in said slipway channel for to and fro movement therealong, said pawl displacer means engaging said second member so as to be driven by the second member into engagement with the pawl in response to relative rotation of the first member with respect to the second member in said first rotational direction to urge the pawl to move toward said second position, said pawl displacer means also being driven by said second member into engagement with said pawl in response to relative rotation in the second rotational direction to urge the pawl to move toward said retracted position in which it is out of engagement with said shoulder to permit free rotation of the first member with respect o the second member in the second rotational direction.

According to a further aspect of the present invention, there is provided in a reel assembly for use in a tape cassette having a reel member which has an axis of rotation about which it rotates in use, an engagement member which is held against rotation by the cassette, and a one-way clutch assembly for preventing rotation of the reel member in a first rotational direction with respect to the engagement member about said axis of rotation, the improvement comprising a pawl having a proximal end and a distal end, the proximal end of said pawl being mounted in a first seat formed in the reel member for pivotal movement with respect to said reel member between a retracted position in which it permits free rotation of the reel member in a second rotational direction and a second position in which the distal end of the pawl extends into a butting relationship with a first shoulder which is formed on the engagement member to thereby prevent free rotation in the first rotational direction, a slipway channel formed between a portion of the reel member and a portion of the engagement member and arranged on the perimeter of a circle which has its center aligned with said axis of rotation, pawl displacer means slidably mounted in said slipway channel for to and fro movement therealong, said pawl displacer means engaging said portion of the engagement member so as to be driven by the engagement member into engagement with the pawl in response to relative rotation of the reel member with respect to the engagement member in said first rotational direction to urge the pawl to move toward said second position, said pawl displacer means also being driven by said second member into engagement with said pawl in response to relative rotation in the second rotational direction to urge the pawl to move toward said retracted position in which it is out of engagement with said shoulder to permit free rotation of the reel member with respect to the engagement member in the second rotational direction.

DESCRIPTION OF PREFERRED EMBODIMENTS

Figure 1:
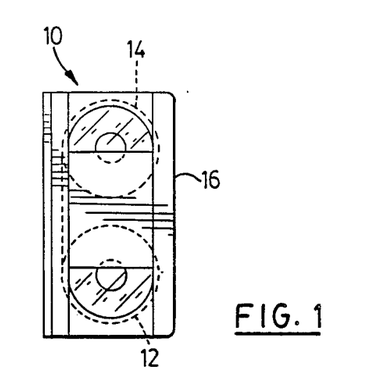
FIG. 1 is a plan view of a tape cassette of the type in which a one-way clutch assembly of the present invention may be employed.

With reference to FIG. 1 of the drawings, the reference numeral 10 refers generally to a cassette for a video tape which has a supply reel 12 and a take-up reel 14 mounted for rotation within a cassette housing 16. In use, the cassette is mounted in a video machine and the tape is drawn past a video playing or recording head as it is taken from the supply reel 12 to the take-up reel 14. The tape can be rewound on the supply reel by reversing the friction of rotation of the drive mechanism which drives the reels.

The present invention is directed to improvements in the clutch mechanism which is incorporated into the take-up reel 14.

Figure 2:
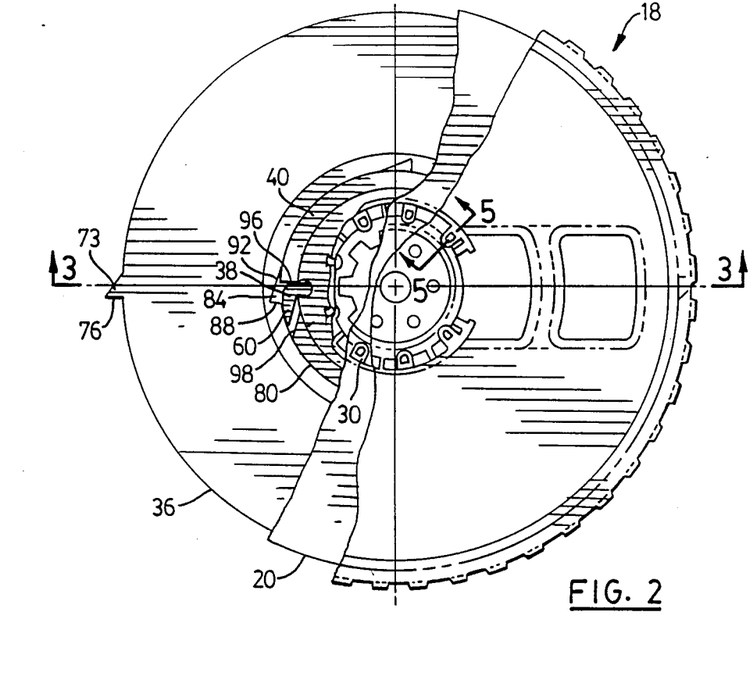
FIG. 2 is a plan view of a reel assembly for use in a tape cassette in which portions have been broken away to illustrate the interior construction.
Figure 3:
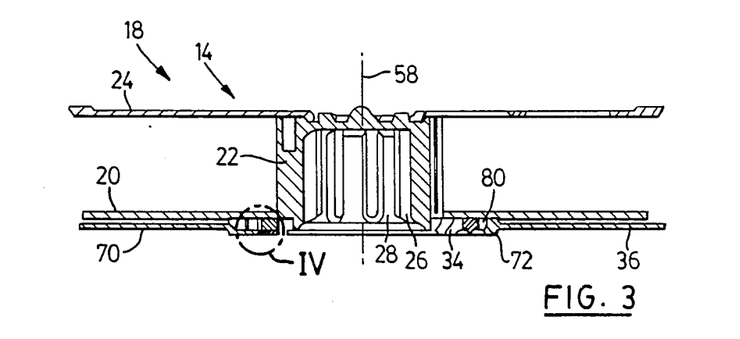
FIG. 3 is a sectional view taken along the line 3—3 of FIG. 2.

With reference to FIG. 2 of the drawings, the reference numeral 18 refers generally to a reel assembly of a construction suitable for use as the take-up reel. The reel assembly 18 consists of a circular disc which forms a bottom wall 20 of the reel. A central boss 22 is formed integrally with the disc 20 and projects upwardly therefrom. A top wall 24 is in the form of a circular disc which is attached to the boss 22 and is arranged in a spaced parallel relationship with respect to the bottom wall 20. Conventional reel driving teeth 26 are formed in the centrally located socket 28. As shown in FIG. 2 of the drawings and in enlarged detail in FIG. 5 of the drawings, a plurality of radially spaced passages 30 are formed in the boss 22. A shoulder 32 extends radially inwardly of the passages 30.

The one-way clutch assembly comprises a first clutch member 34, a second clutch member 36, a pawl 38 and a displacer ring 40. The first clutch member 34 is held fast with respect to the take-up reel 14 and the second clutch member is held against rotation by the cassette housing 16.

Figure 12:
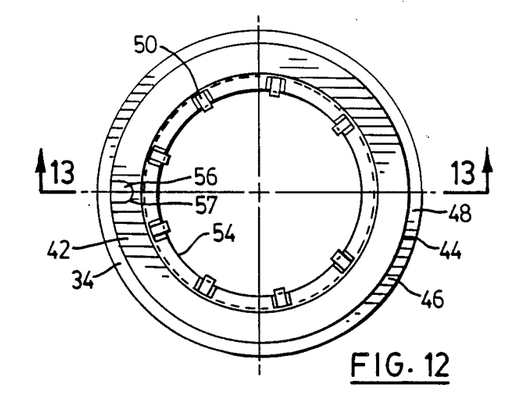
FIG. 12 is a plan view of the retainer ring which serves to maintain the reel assembly in the assembled configuration.
Figure 13:
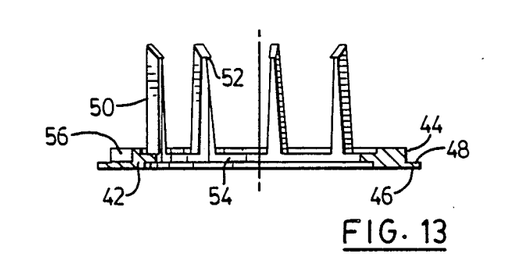
FIG. 13 is a sectional view of the retainer ring taken along the line 13—13 of FIG. 12.
Figure 14:
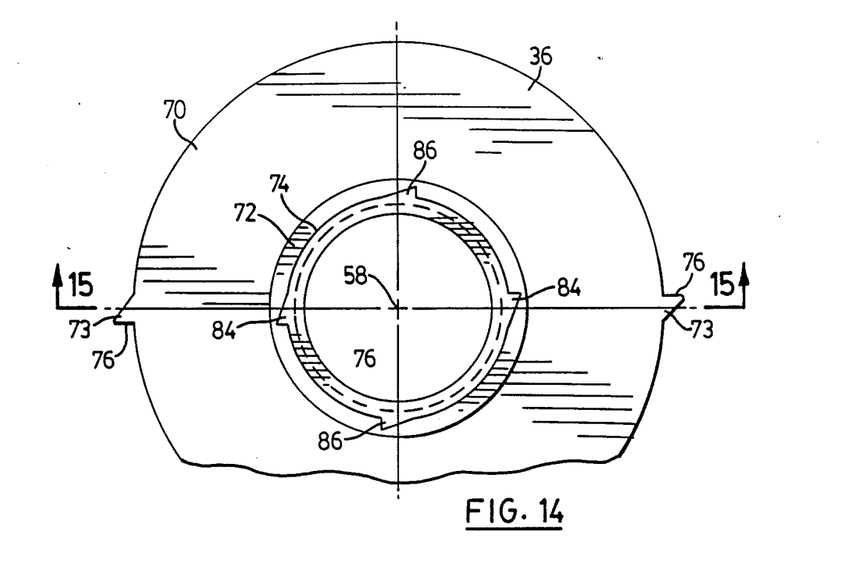
FIG. 14 is a plan view of the cassette engaging member showing the, slipway passage in plan view.
Figure 15:
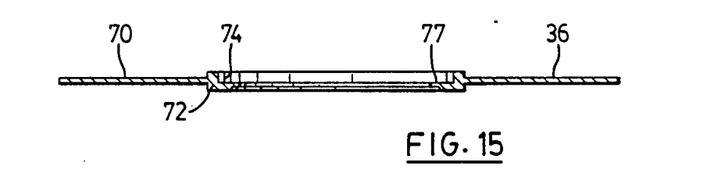
FIG. 15 is a sectional view taken along the line 15—15 of FIG. 14.

The first clutch member 34 is shown in detail in FIGS. 12 and 13 of the drawings to which reference is now made. As shown in FIGS. 12 and 13, the first clutch member 34 comprises an annular collar 42 which has a cylindrical-shaped outer side face 44 and a short annular lip 46 which projects outwardly from the surface 44 and has an upper face 48. A plurality of legs 50 project upwardly from the collar 42 and, as shown in FIG. 13, each leg 50 has a shoulder 52 which projects inwardly from the perimeter of the through passage 54 of the collar 42. A pawl mounting recess 56 is formed in the collar 42 and opens outwardly through the side face 44. The recess 56 has an arcuate-shaped inner face 57. The recess 56 serves to form a pawl mounting seat.

Figure 5:
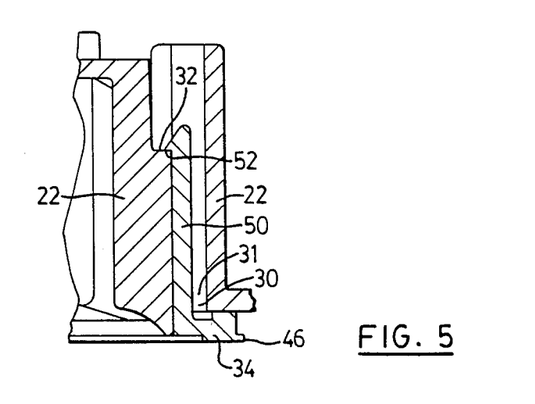
FIG. 5 is a sectional view taken along the line 5—5 of FIG. 2.

As shown in FIG. 5 of the drawings, the first clutch member 34 is attached to the boss 22 of the take-up reel by inserting the legs 50 into the passages 30 until the shoulder 52 overlies the shoulder 32 and thereby serves to prevent axial removal of the first clutch member 34. The side faces 31 of the, passages 30 will bear against the side faces of the legs 50 in order to prevent rotational movement of the first clutch member 34 with respect to the take-up reel.

Figure 8:
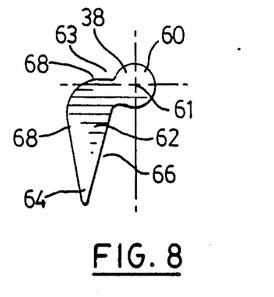
FIG. 8 is a plan view of a pawl suitable for use in the clutch mechanism of the present invention.
Figure 9:
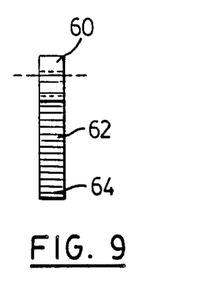
FIG. 9 is a side elevation of the pawl of FIG. 8.

The pawl 38 is more clearly illustrated in FIGS. 8 and 9 of the drawings to which reference is now made. The pawl 38 has a proximal end portion 60 which is substantially circular in cross-section and an arm portion 62 which projects outwardly from the proximal end portion 60 and has a distal end 64. The arm 62 has a front face 66 and a back face 68. The front face 66 and back face 68 are both angularly inclined with respect to a radius extending from the axis 61 of the proximal end portion 60. The front face 66 and the back face 68 diverge as they extend away from the proximal end portion 60. A notch 63 is formed in the back face 68 of the pawl.

Figure 6:
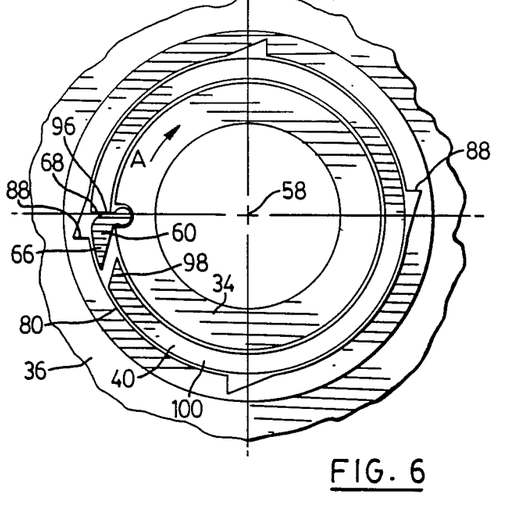
FIG. 6 is a plan view of a portion of the clutch mechanism showing the locking pawl arranged to lock in response to rotation in a counter-clockwise direction.
Figure 7:
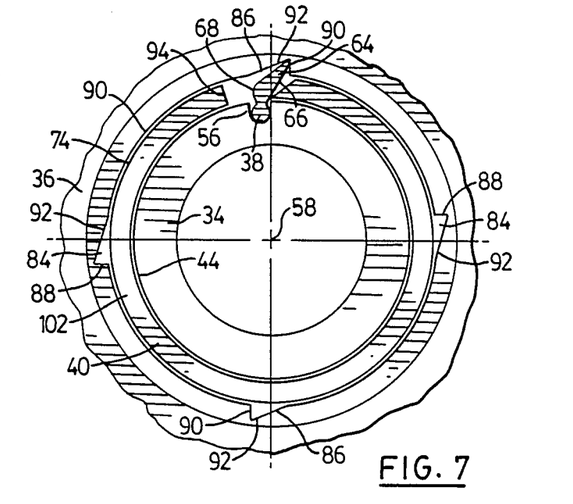
FIG. 7 is a plan view similar to FIG. 6 showing the pawl rearranged so as to lock in response to rotation in a clockwise direction.

The proximal end portion 60 of the pawl 38 is proportioned to fit in a free-fitting pivotal relationship within the pawl mounting recess or seat 56. It will be noted that the pawl 38 may be mounted in the recess 56 such that the front face 66 is arranged to face in a counter-clockwise direction with respect to the axis 58 as shown in FIG. 6 or in a clockwise direction as shown in FIG. 7.

The second clutch member 36 comprises a thin annular disc 70 which has a collar portion 72 of a greater thickness formed at its inner perimeter. A lug 73 projects outwardly from the outer perimeter of the disc 70 and has a shoulder portion 76 arranged to face in the direction of counter-clockwise rotation. The shoulder, 76 bears against a complimentary stop member formed in the cassette housing 16 which serves to prevent rotation of the disc 70 with respect to the cassette housing in the counter-clockwise direction such that the second clutch member 36 acts as an engagement member which is held fast with respect to the cassette in use.

As shown in FIGS. 3, 4, 6 and 7 of the drawings, an annular slipway channel 80 is formed between the first clutch member 34 and the second clutch member 36.

Figure 4:
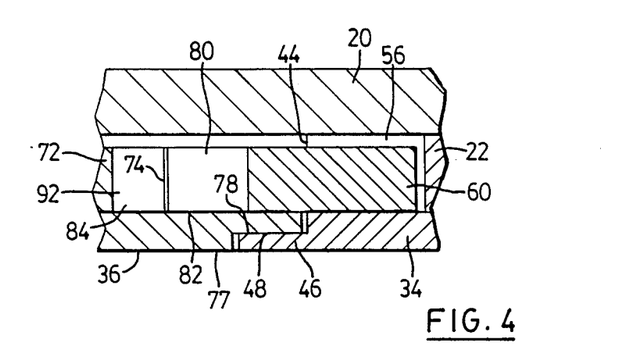
FIG. 4 is an enlarged detail of the area IV of FIG. 3.

As shown in FIG. 4 of the drawings, the slipway channel 80 has an inner side wall which is formed by the side face 44 of the first clutch member 34. The channel 80 also has an outer side wall 74 which is formed on the second clutch member 36 and extends circumferentially about the axis 58. The bottom face of the channel is identified by the reference numeral 82 and is formed on the lip portion 77 which projects radially inwardly of the collar portion 72 of the second clutch member 36. The lip portion 77 has a recess 78 formed in the lower face thereof which is arranged to bear against the face 48 of the lip 46 of the first clutch member 34.

A first pair of notches 84 (FIG. 7) and a second pair of notches 86 are formed in the collar portion 72 of the second clutch member 36 and extend outwardly from the outer side face 74 of the slipway channel 80. The notches 84 have a shoulder 88 facing in a clockwise direction with respect to the axis 58 and the notches 86 have a shoulder 90 facing in the counterclockwise direction. The notches 84 and 86 each have an inclined ramp face 92.

The displacer ring 40 is mounted in the slipway channel 80 so as to slide freely therein. The displacer ring 40 is proportioned to provide a nominal clearance of about 0.005" between the displacer ring 40 and the second clutch member 36. A clearance is also provided between the displacer ring 40 and the first clutch member 34 which is greater than the clearance between the displacer ring and the second clutch member. In a typical clutch the clearance between the displacer ring 40 and the first clutch member 34 may be 0.010" when the clearance between the displacer ring and the second clutch member is 0.005". As a result, translation of the displacer ring within the slipway channel 80 is permitted. This translation is advantageous because it will ensure that when the reel is mounted for rotation about a horizontal axis, there is contact between the outer edge 106 of the displacer ring and the outer side face 74 of the slipway channel which will establish a sufficient frictional resistance to rotational movement of the displacer ring with respect to the second clutch member to ensure that the displacer ring will be effective when used to displace the pawl into the notches 84 or 86 in use.

Figure 10:
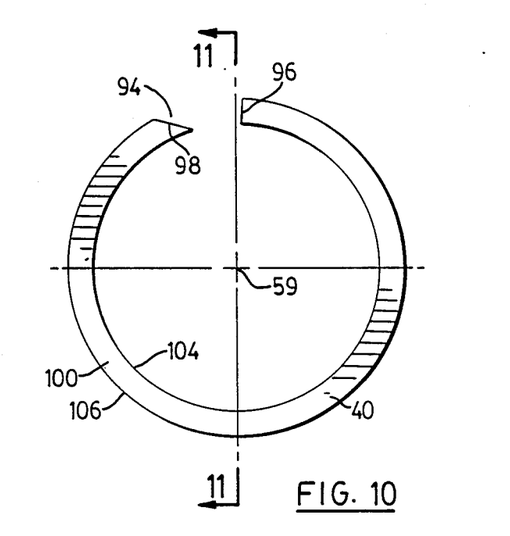
FIG. 10 is a plan view of a pawl displacer ring.
Figure 11:
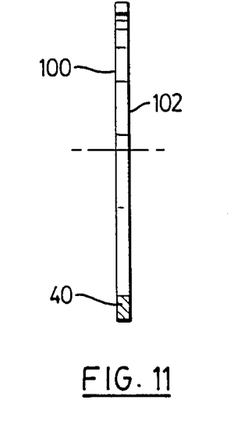
FIG. 11 is a sectional view of the pawl displacer ring taken along the line 11—11 of FIG. 10.

The displacer ring 40 is illustrated in detail in FIGS. 10 and 11 of the drawings wherein it will be seen that the ring 40 has a pawl accommodating passage 94 formed between oppositely disposed end faces 96 and 98. The end face 96 extends substantially radially from the axis 59 and the end face 98 is angularly inclined so that it diverges with respect to the end face 96 in a direction away from the axis 59. The end face 98 is arranged so that it will apply a load to the pawl 38 in the circumferential direction of the channel 80 as shown in FIG. 7, to displace the pawl 38 outwardly into the notch 86 to engage the shoulder 90. When the pawl 38 is fully seated in the notch 86, the front face 66 of the pawl 38 bears against the shoulder 90 in a face-to-face relationship and the distal end 64 bears against the inclined face 92 in a face-to-face relationship. When the arm portion 62 is fully withdrawn within the channel 80 as shown in FIG. 6, the face 66 extends in a face-to-face parallel relationship with the end 98 of the displacer ring 40.

In order to minimize the drag or braking action of the pawl when the reel is driven in the disengaged direction A (FIG. 6) the end face 96 extends substantially radially and the pawl is formed with a notch 63 which has a face 68 which will extend substantially radially when in contact with the end face 96. As a result, contact between the pawl and the displacer ring occurs along a radial line which originates at the center of rotation and consequently the major component of the force which drives the displacer ring is applied tangentially in the direction of the slipway.

The ring 40 also has oppositely disposed flat side faces 100 and 102. When the ring 40 is positioned with the flat face 102 resting on the bottom face 82 of the slipway channel 80, the pawl accommodating passage 94 is angularly inclined in the counter-clockwise direction as it extends from the inner edge 104 to the outer edge 106. This is the position shown in FIG. 6 of the drawings which serves to locate the pawl 38 so that its inclined face 66 may be displaced into engagement with the shoulders 88.

As shown in FIG. 7, the displacer ring may be arranged with the side face 100 bearing against the bottom face of the channel and in this arrangement, the passage 94 is arranged to be angularly inclined in the clockwise direction and will serve to displace the pawl member to engage the shoulders 90.

After determining whether it is necessary to prevent rotation of the reel in the clockwise or the counter-clockwise direction, the pawl 38 is positioned in the appropriate orientation in its seat 56 and the displacer ring 40 is likewise positioned to provide the appropriate angle of inclination of the pawl accommodating passage 94. The assembly is completed by inserting the legs 50 of the first clutch member 34 into the passages 30 which are formed in the central boss 22 until the shoulder 52 rests on the shoulder 32 as previously described.

When the reel is assembled as shown in FIG. 2 of the drawings, it is intended that counter-clockwise direction of the reel will not be permitted. When the boss 22 of the reel illustrated in FIGS. 2 and 3 of the drawings is rotatably driven by the output shaft of a VCR or the like, the face 68 of the notch of the pawl 38 will be driven against the end face 96 of the displacer ring 40 while in the retracted position shown in FIG. 2.

As previously indicated, when the reel is mounted for rotation about a vertical axis the displacer ring 40 rests on the bottom face 82 of the channel 80 (FIG. 4) with the result that there is a frictional resistance to rotation which will tend to urge the pawl to pivot outwardly toward the extended position shown in FIG. 7. Similarly, if the pawl 38 was previously displaced outwardly into a notch 84, the end face 96 would displace the distal end of the pawl 38 to assume the position shown in FIG. 2 in which it is fully accommodated within the slipway channel 80. When the pawl 38 is in the position shown in FIG. 2, the reel is free to rotate with respect to the disc 70 in the clockwise direction. If, however, an attempt is made to reverse the direction of rotation so that the reel is driven in the counter-clockwise direction, the frictional resistance to rotational movement of the displacer ring 40 which is caused by the fact that it rests on the stationary disc 70 will tend to urge the pawl 38 to pivot from a retracted position to the extended position in which the distal end will project into the next available notch 84 which it encounters. As a result, the rotation in the counter-clockwise direction will be halted when the pawl 38 engages the shoulder 88. In FIG. 7, the pawl 38 is shown in the extended position in which it is arranged to bear against the shoulder 90 and thereby prevent rotation in the clockwise direction.

From the foregoing, it will be apparent that the present invention provides a simple and efficient one-way clutch mechanism. The clutch mechanism is particularly well suited for use in a reel assembly of a tape to permit one-way rotation of the reel.

We claim:
1. In a one-way clutch assembly for preventing rotation of a first member in a first rotational direction with respect to a second member about an axis of rotation and in which a pawl has its proximal end mounted in a first seat for pivotal movement of the pawl with respect to the first member so as to be movable between a retracted position in which it permits free rotation of the first member relative to the second member in a second rotational direction and a second position in which the distal end of the pawl extends into a butting relationship with a first shoulder formed on the second member to prevent free rotation in the first rotational direction, the improvement of;
  (a) a slipway channel formed between a portion of the first member and a portion of the second member and arranged on the perimeter of a circle which has its axis coaxially arranged with respect to said axis of rotation, said channel having oppositely disposed side walls formed one on the first member and one on the second member,
  (b) pawl displacer means slidably mounted in said slipway channel for to and fro movement therealong, said pawl displacer means engaging said second member so as to be driven by the second member into engagement with the pawl in response to relative rotation of the first member with respect to the second member in said first rotational direction to urge the pawl to move toward said second position, said pawl displacer means also being driven by said second member into engagement with said pawl in response to relative rotation in the second rotational direction to urge the pawl to move toward said retracted position in which it is out of engagement with said shoulder to permit free rotation of the first member with respect to the second member in the second rotational direction.

2. A one-way clutch assembly as claimed in claim 1, wherein said slipway channel is an annular channel and said pawl displacer means comprises a displacer ring, said displacer ring having a pawl accommodating slot extending across the slipway channel, said pawl member having a portion of its length located in said pawl accommodating slot, said first and second end faces of said displacer means being located on opposite ends of said displacer ring at opposite sides of said pawl accommodating slot.

3. A one-way clutch assembly as claimed in claim 2, wherein said slipway channel has a bottom face which has a circumferentially extending section of its length formed on said second member, said displacer ring bearing against said circumferentially extending section of the length of the second member so as to be driven by frictional contact with the second member into contact with the pawl in response to relative rotation of the first member with respect to the second member.

4. A one-way clutch assembly as claimed in claim 3, wherein a first of said end faces of said displacer ring is located behind said pawl with respect to the first rotational direction of said first member, said first end face extending substantially radially from said axis of rotation and being arranged to apply a load to the back face of the pawl in the circumferential direction of said channel to urge the pawl into engagement with said shoulder in use.

5. A one-way clutch assembly as claimed in claim 4, wherein a second of said end faces of said displacer ring is located on the other side of said pawl, with respect to the first rotational direction of the first member, said first face being inclined in the second rotational direction from the inner face of said channel to the outer face thereof to accommodate the pawl in its retracted position when the displacer ring is rotatably driven in said second rotational direction.

6. A one-way clutch assembly as claimed in claim 1, wherein said displacer means is in the form of a split ring which has oppositely disposed free ends which form said first and second end faces of said displacer means and wherein a pawl accommodating gap is formed between the free ends of the displacer ring.

7. A one-way clutch assembly as claimed in claim 1, wherein the second member is located radially outwardly from the first member.

8. A one-way clutch assembly as claimed in claim 7, wherein a second shoulder is formed in the second member, said second shoulder being arranged to face in a direction which is opposite to that in which the first shoulder faces, and wherein, a second seat is formed in said first member, said second seat being arranged to pivotally support a pawl for movement into and out of engagement with said second shoulder, said pawl being selectively mounted in said first or second seat to be operable to butt against said first shoulder or said second shoulder to prevent rotation of said first member with respect to the second member in the first or second rotational direction as required in use.

9. A one-way clutch assembly as claimed in claim 7, wherein said slipway channel is an annular channel and said pawl displacer means comprises a displacer ring, said displacer ring having a pawl accommodating slot extending across the slipway channel, said pawl member having a portion of its length located in said pawl accommodating slot, said first and second end faces of said displacer means being located on opposite ends of said displacer ring at opposite sides of said pawl accommodating slot.

10. A one-way clutch assembly as claimed in claim 9, wherein said slipway channel has a bottom face which has a circumferentially extending section of its length formed on said second member, said displacer ring bearing against said circumferentially extending section of the length of the second member so as to be driven by frictional contact with the second member into contact with the pawl in response to relative rotation of the first member with respect to the second member.

11. A one-way clutch assembly as claimed in claim 9, wherein a first of said end faces of said displacer ring is located behind said pawl with respect to the first rotational direction of said first member, said first end face extending substantially radially from said axis of rotation and being arranged to apply a load to the back face of the pawl in the circumferential direction of said channel to urge the pawl into engagement with said shoulder in use.

12. A one-way clutch assembly as claimed in claim 11, wherein a second of said end faces of said displacer ring is located on the other side of said pawl, with respect to the first rotational direction of the first member, said first face being inclined in the second rotational direction from the inner face of said channel to the outer face thereof to accommodate the pawl in its retracted position when the displacer ring is rotatably driven in said second rotational direction.

13. A one-way clutch assembly as claimed in claim 2, wherein said slipway channel has an outer side face which is formed on said second member, said displacer ring bearing against said outer side face of said channel to provide frictional engagement with the second member so that the displacer ring may be driven by frictional contact with the second member into contact with the pawl in response to relative rotation of the first member with respect to the second member when the axis of rotation is horizontally oriented.

14. A one-way clutch assembly as claimed in claim 13, wherein a first of said end faces of said displacer ring is located behind said pawl with respect to the first rotational direction of said first member, said first end face extending substantially radially from said axis of rotation and being arranged to apply a load to the back face of the pawl in the circumferential direction of said channel to urge the pawl into engagement with said shoulder in use.

15. In a reel assembly for use in a tape cassette having a reel member which has an axis of rotation about which it rotates in use, an engagement member which is held against rotation by the cassette, and a one-way clutch assembly for preventing rotation of the reel member in a first rotational direction with respect to the engagement member about said axis of rotation, the improvement comprising;
   (a) a pawl having a proximal end and a distal end, the proximal end of said pawl being mounted in a first seat formed in the reel member for pivotal movement with respect to said reel member between a retracted position in which it permits free rotation of the reel member in a second rotational direction and a second position in which the distal end of the pawl extends into a butting relationship with a first shoulder which is formed on the engagement member to thereby prevent free rotation in the first rotational direction,
   (b) a slipway channel formed between a portion of the reel member and a portion of the engagement member and arranged on the perimeter of a circle which has its center aligned with said axis of rotation,
   (c) pawl displacer means slidably mounted in said slipway channel for to and fro movement therealong, said pawl displacer means engaging said portion of the engagement member so as to be driven by the engagement member into engagement with the pawl in response to relative rotation of the reel member with respect to the engagement member in said first rotational direction to urge the pawl to move toward said second position, said pawl displacer means also being driven by said second member into engagement with said pawl in response to relative rotation in the second rotational direction to urge the pawl to move toward said retracted position in which it is out of engagement with said shoulder to permit free rotation of the reel member with respect to the engagement member in the second rotational direction.

16. A reel assembly as claimed in claim 15, wherein said slipway channel is an annular channel and said pawl displacer means comprises a displacer ring, said displacer ring having a pawl accommodating slot extending across the slipway channel, said pawl member having a portion of its length located in said pawl accommodating slot, said first and second end faces of said displacer means being located on opposite ends of said displacer ring at opposite sides of said pawl accommodating slot.

17. A reel assembly as claimed in claim 15, wherein said slipway channel has a bottom face which has a circumferentially extending section of its length formed on said second member, said displacer ring bearing against said circumferentially extending section of the length of the second member so as to be driven by frictional contact with the second member into contact with the pawl in response to relative rotation of the first member with respect to the second member.

18. A reel assembly as claimed in claim 17, wherein a first of said end faces of said displacer ring is located behind said pawl with respect to the first rotational direction of said first member, said first end face extending substantially radially from said axis of rotation and being arranged to apply a load to the back face of the pawl in the circumferential direction of said channel to urge the pawl into engagement with said shoulder in use.

19. A reel assembly as claimed in claim 16, wherein said slipway channel has an outer side face which is formed on said second member, said displacer ring bearing against said outer side face of said channel to provide frictional engagement with the second member so that the displacer ring may be driven by frictional contact with the second member into contact with the pawl in response to relative rotation of the first member with respect to the second member when the axis of rotation is horizontally oriented.

20. A reel assembly as claimed in claim 19, wherein a first of said end faces of said displacer ring is located behind said pawl with respect to the first rotational direction of said first member, said first end face extending substantially radially from said axis of rotation and being arranged to apply a load to the back face of the pawl in the circumferential direction of said channel to urge the pawl into engagement with said shoulder in use.

21. A reel assembly as claimed in claim 18, wherein a second of said end faces of said displacer ring is located on the other side of said pawl, with respect to the first rotational direction of the first member, said first face being inclined in the second rotational direction from the inner face of said channel to the outer face thereof to accommodate the pawl in its retracted position when the displacer ring is rotatably driven in said second rotational direction.

22. A reel assembly as claimed in claim 15, wherein said displacer means is in the form of a split ring which has oppositely disposed free ends which form said first and second end faces of said displacer means and wherein a pawl accommodating gap is formed between the free ends of the displacer ring.

23. A reel assembly as claimed in claim 17, wherein the second member is located radially outwardly from the first member.

24. A reel assembly as claimed in claim 23, wherein a second shoulder is formed in the second member, said second shoulder being arranged to face in a direction which is opposite to that in which the first shoulder faces, and wherein, a second seat is formed in said first member, said second seat being arranged to pivotally support a pawl for movement into and out of engagement with said second shoulder, said pawl being selectively mounted in said first or second seat to be operable to butt against said first shoulder or said second shoulder to prevent rotation of said first member with respect to the second member in the first or second rotational direction as required in use.

25. A reel assembly as claimed in claim 23, wherein said slipway channel is an annular channel and said pawl displacer means comprises a displacer ring, said displacer ring having a pawl accommodating slot extending across the slipway channel, said pawl member having a portion of its length located in said pawl accommodating slot, said first and second end faces of said displacer means being located on opposite ends of said displacer ring at opposite sides of said pawl accommodating slot.

26. A reel assembly as claimed in claim 25, wherein said slipway channel has a bottom face which has a circumferentially extending section of its length formed on said second member, said displacer ring bearing against said circumferentially extending section of the length of the second member so as to be driven by frictional contact with the second member into contact with the pawl in response to relative rotation of the first member with respect to the second member.

27. A one-way clutch assembly as claimed in claim 26, wherein a first of said end faces of said displacer ring is located behind said pawl with respect to the first rotational direction of said first member, said first end face extending substantially radially from said axis of rotation and being arranged to apply a load to the back face of the pawl in the circumferential direction of said channel to urge the pawl into engagement with said shoulder in use.

28. A one-way clutch assembly as claimed in claim 27, wherein a second of said end faces of said displacer ring is located on the other side of said pawl, with respect to the first rotational direction of the first member, said first face being inclined in the second rotational direction from the inner face of said channel to the outer face thereof to accommodate the pawl in its retracted position when the displacer ring is rotatably driven in said second rotational direction.

29. A reel assembly for use in a tape cassette having a reel member which is mounted for rotation with respect to a stationary member which is held against rotation by the cassette, and a one-way clutch assembly for preventing rotation of the reel member in a first rotational direction with respect to the stationary member about said axis of rotation, the improvement comprising;
 (a) a pawl which is mounted on one of said members for pivotal movement into and out of engagement with a shoulder formed on the other of said members to dock the members against relative rotation in one direction about said axis which permits rotation of the other direction,
 (b) a slipway channel formed between said members and arranged on the perimeter of a circle which has its center aligned with said axis of rotation,
 (c) pawl displacer means slidably mounted in said slipway channel for to and fro movement therealong, said pawl displacer means engaging one of said members so as to be driven into engagement with the pawl in response to said relative rotation in said first rotational direction to urge the pawl to move toward engagement with said shoulder, said pawl displacer means also being driven in response to relative rotation in the second rotational direction to urge the pawl to move out of engagement, with said shoulder to permit free rotation of the reel member with respect to the stationary member in the second rotational direction.

* * * * *